United States Patent
Ahmad

(10) Patent No.: US 11,297,168 B2
(45) Date of Patent: Apr. 5, 2022

(54) LIGHTING AUTOMATION NETWORK

(71) Applicant: Dialight Corporation, Farmingdale, NJ (US)

(72) Inventor: Rizwan Ahmad, Edison, NJ (US)

(73) Assignee: Dialight Corporation, Farmingdale, NJ (US)

( * ) Notice: Subject to any disclaimer, the term of this patent is extended or adjusted under 35 U.S.C. 154(b) by 12 days.

(21) Appl. No.: 15/851,623

(22) Filed: Dec. 21, 2017

(65) Prior Publication Data
US 2018/0183902 A1 Jun. 28, 2018

Related U.S. Application Data

(60) Provisional application No. 62/439,702, filed on Dec. 28, 2016.

(51) Int. Cl.
*H04L 29/06* (2006.01)
*H04L 12/66* (2006.01)
(Continued)

(52) U.S. Cl.
CPC .............. *H04L 69/08* (2013.01); *H04L 12/66* (2013.01); *H04L 67/12* (2013.01)

(58) Field of Classification Search
CPC .......... H04L 69/08; H04L 12/66; H04L 67/12
See application file for complete search history.

(56) References Cited

U.S. PATENT DOCUMENTS 6,173,312 B1 * 1/2001 Atarashi ........... H04L 29/12009
370/409
7,130,895 B2 * 10/2006 Zintel ................. H04L 12/2805
709/220
(Continued)

FOREIGN PATENT DOCUMENTS

WO 2006017796 A2 2/2006
WO WO 2006/017796 A2 2/2006

OTHER PUBLICATIONS

International Search Report and Written Opinion of corresponding PCT Application No. PCT/US2017/068040, Mar. 8, 2018, 11 pages.
(Continued)

*Primary Examiner* — Huy D Vu
*Assistant Examiner* — Bailor C. Hsu
(74) *Attorney, Agent, or Firm* — Tong, Rea, Bentley & Kim, LLC

(57) ABSTRACT

A lighting network control server and method for translating non-light related data packets into a protocol that is compatible with a third party automation server are disclosed. For example, the lighting network control server includes a communication interface to receive data packets from a lighting network and to communicate with a third party automation server, a non-transitory computer readable medium to store sub-routines and instructions to execute a protocol adapter, and a processor communicatively coupled to the communication interface and the non-transitory computer readable medium to execute the protocol adapter to translate the data packets into a protocol that is compatible with the third party automation server and transmit the data packets that are translated to the third party automation server via the communication interface.

14 Claims, 3 Drawing Sheets

(51) Int. Cl.
*H04L 69/08* (2022.01)
*H04L 67/12* (2022.01)

(56) References Cited

U.S. PATENT DOCUMENTS

| | | | | |
|---|---|---|---|---|
| 7,539,487 | B2* | 5/2009 | Sinclair | H04M 1/72412 455/419 |
| 7,764,167 | B2* | 7/2010 | Reeves | G08B 21/04 340/426.22 |
| 8,276,193 | B2* | 9/2012 | Cox | H04L 43/0876 463/25 |
| 8,368,310 | B1* | 2/2013 | Roosli | H05B 37/0245 315/152 |
| 8,576,746 | B2* | 11/2013 | Lee | H04L 29/12801 370/254 |
| 8,667,100 | B2* | 3/2014 | Dixon | H04L 65/1073 709/221 |
| 8,738,190 | B2* | 5/2014 | Pai | G05B 15/02 700/286 |
| 9,235,277 | B2* | 1/2016 | Tan | G06F 3/01 |
| 9,456,293 | B2 | 9/2016 | Ryhorchuk | |
| 9,531,559 | B1* | 12/2016 | Vlaminck | H04W 4/70 |
| 10,218,530 | B2* | 2/2019 | Tappeiner | G05B 13/02 |
| 10,310,474 | B2* | 6/2019 | Wernersbach | G05B 19/0428 |
| 10,327,314 | B1* | 6/2019 | Shin | H05B 47/19 |
| 2008/0021963 | A1* | 1/2008 | Jana | H04L 67/26 709/206 |
| 2009/0006522 | A1* | 1/2009 | Kim | H04L 69/08 709/201 |
| 2009/0009282 | A1 | 1/2009 | Wang et al. | |
| 2010/0082730 | A1* | 4/2010 | Fujimori | H04L 41/0226 709/202 |
| 2014/0344269 | A1* | 11/2014 | Dong | H04L 67/12 707/736 |
| 2015/0043426 | A1 | 2/2015 | Aggarwal et al. | |
| 2015/0102733 | A1 | 4/2015 | Knapp et al. | |
| 2016/0000641 | A1* | 1/2016 | Driscoll | A61H 23/02 600/38 |
| 2016/0021189 | A1* | 1/2016 | Kumar | H04L 67/12 709/231 |
| 2016/0081166 | A1* | 3/2016 | Eddins | H05B 37/0254 315/294 |
| 2016/0088708 | A1* | 3/2016 | Anthony | H05B 37/029 315/294 |
| 2016/0091217 | A1* | 3/2016 | Verberkt | G06F 8/654 700/276 |
| 2016/0352577 | A1 | 12/2016 | Schiff et al. | |
| 2017/0231066 | A1* | 8/2017 | Roberts | G06K 9/6202 |

OTHER PUBLICATIONS

EP Search Report dated Jul. 15, 2020 in corresponding EP Application No. 17886901.1, 13 pages.
European Patent Office Examination Report mailed in Corresponding Application No. 17886901.2-1213 dated Oct. 25, 2021, 10 pages.
Australian Government IP Australia, Examination Report mailed in corresponding Application No. 2017386521 dated Oct. 21, 2021, 4 pages.

* cited by examiner

LIGHTING AUTOMATION NETWORK

CROSS REFERENCE TO RELATED APPLICATIONS

This application claims priority under 35 U.S.C. § 119(e) to U.S. provisional patent application Ser. No. 62/439,702, filed on Dec. 28, 2016, which is hereby incorporated by reference in its entirety.

BACKGROUND OF THE INVENTION

Third party automation networks are used to control various devices, sensors, and the like. The third party automation networks each use a proprietary protocol to allow a device or sensor to communicate with a control server of the third party automation network. Currently, lighting networks are not adapted to work with these third party automation networks.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

SUMMARY

Figure 1:
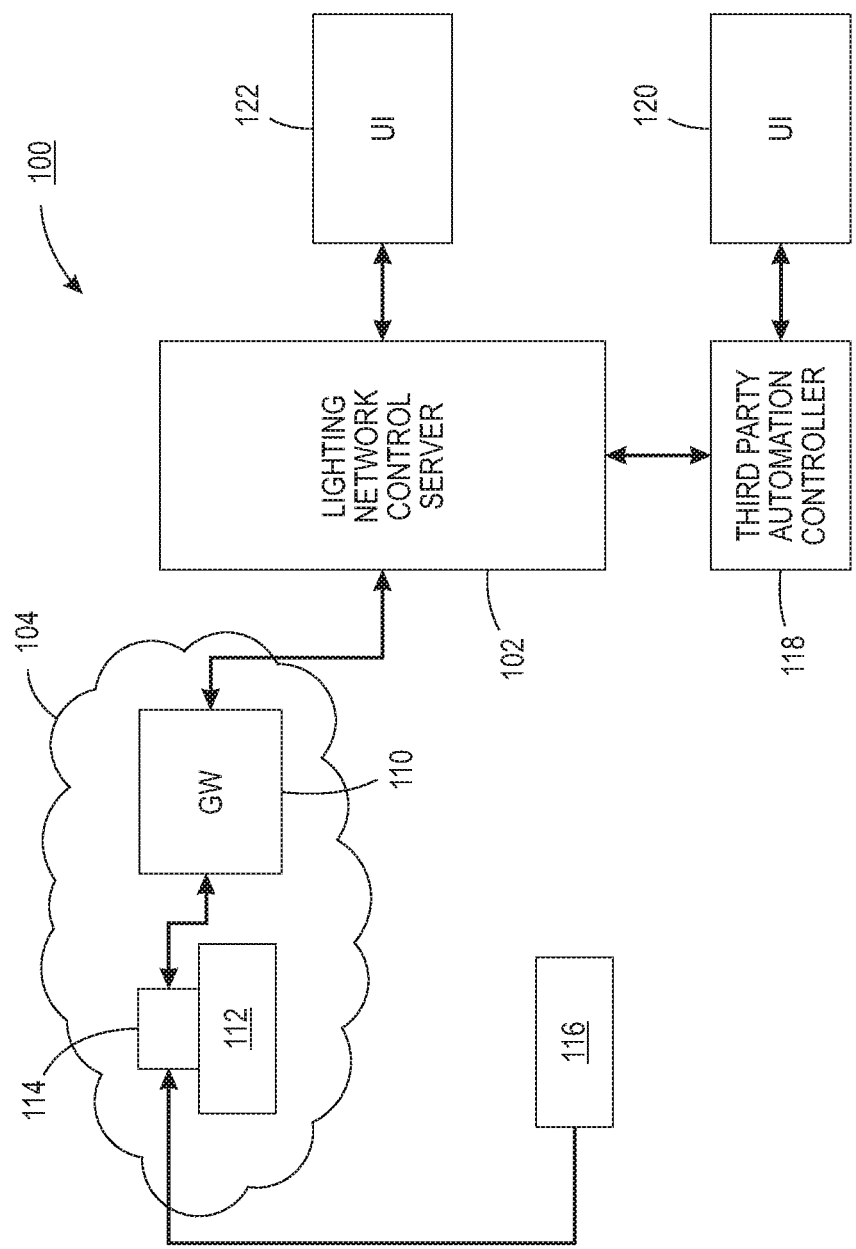
FIG. 1 illustrates a block diagram of an example lighting network of the present disclosure.

The present disclosure relates generally to a lighting network control server. In one embodiment, the lighting network control server comprises a communication interface to receive data packets from a lighting network and to communicate with a third party automation server, a non-transitory computer readable medium to store sub-routines and instructions to execute a protocol adapter, and a processor communicatively coupled to the communication interface and the non-transitory computer readable medium to execute the protocol adapter to translate the data packets into a protocol that is compatible with the third party automation server and transmit the data packets that are translated to the third party automation server via the communication interface.

The present disclosure also provides a method and a non-transitory computer readable medium storing instructions, which when executed by a processor of a lighting system control server, cause the processor to perform operations. In one embodiment, the operations comprise receiving a non-light related data packet from a lighting network, translating the non-light related data packet into a protocol compatible with a third party automation server, and transmitting the non-light related data packet that has been translated into the third party automation server for analysis via a sub-routine that is downloaded from the lighting system control server.

DETAILED DESCRIPTION

The present invention discloses a lighting network that can communicate with a third party automation network. As discussed above, third party automation networks are used to control various devices, sensors, and the like. The third party automation networks each use a proprietary protocol to allow a device or sensor to communicate with a control server of the third party automation network. Currently, lighting networks are not adapted to work with these third party automation networks.

However, lighting networks are ubiquitous. Every building, factory, structure, tunnel, space, and the like, require a network of lights. Lighting devices have evolved such that lights now have communication capability. For example, lighting devices may be capable of communicating with one another and transmitting control signals or lighting data to a lighting system control server. The control signals and data packets can be transmitted between the lighting devices and to/from the lighting system control server via either a wired or wireless connection.

Thus, most buildings, factories, structures, tunnels, spaces, and the like, have a communication network that could be used to transmit data. However, as noted above, the lighting networks are not currently compatible with third party automation networks. As a result, the communication capability is not currently being used with third party automation networks.

One embodiment of the present disclosure provides a modified lighting system control server that provides an interface and a protocol conversion between the lighting network and the third party automation network. As a result, different types of data, including data unrelated to the lighting devices or the lighting network, may be transmitted over the lighting network to the third party automation network for further analysis and correlation.

For example, sensor data that is triggered throughout a building, or a factory, may be wirelessly sent over the lighting network to a third party automation control server. The third party automation control server may then correlate the sensor data to potential security breaches within the building or factory. In another example, workers in a mine may wear heart beat monitors and breathing monitors. The data for each worker may be transmitted via the lighting network to a third party automation control server for further analysis and correlation. The heart beat and breathing data may be used to identify those workers that may be experiencing a health issue or require a break. Numerous other examples may be evident within the context of the present disclosure.

In one embodiment, the present disclosure may also provide a plurality of sub-routines that are used by the third party automation control server to properly analyze or correlate the translated data for a particular application. For example, some third party automation service providers may use add on instructions (AOIs) to modify software of a third party controller for a particular application. Applications or sub-routines may be written to correlate sensor data to security breaches or to correlate heart beat data and breathing data to potential health issues. These sub-routines may be software code, instructions, programs, and the like that are stored in memory and executed by a processor (e.g., a third party automation controller/server). The sub-routines may be stored within a database or memory of the lighting network control server and be downloaded by the third party automation network.

For example, a library of sub-routines may be stored at the lighting network control server. A graphical user interface may be used to view, select and download the sub-routines that a third party automation network desires for one or more different applications.

Thus, the embodiments of the present disclosure provide modifications to a lighting network to allow existing third party automation networks to leverage the data transmission capabilities of the lighting network. As a result, costs savings and efficiency may be realized as additional hardware costs and installation costs for deploying a data transmission network may be avoided.

Figure 2:
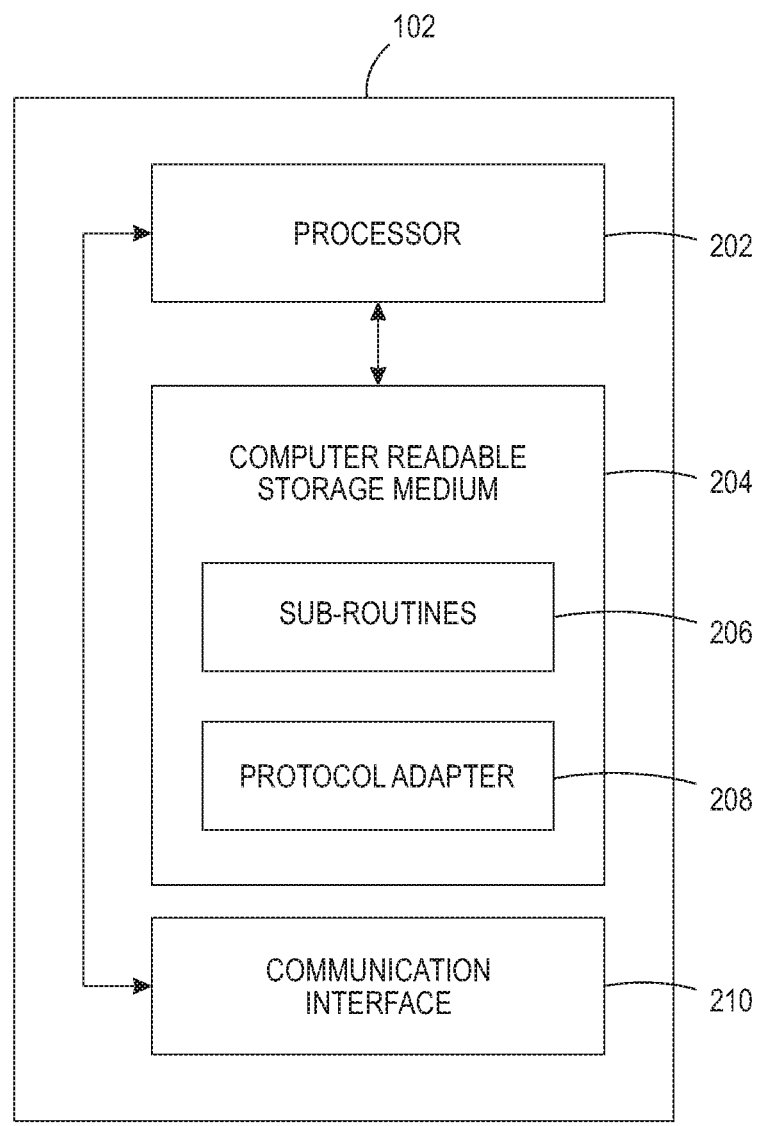
FIG. 2 illustrates a block diagram of an example lighting network control server.

FIG. 1 illustrates an example network 100 of the present disclosure. The network 100 may include a lighting network control server 102 that is in communication with a lighting network 104 and a third party automation controller 118. One example of a lighting network control server 102 may include a Dialight® Architecture for Control System (DACS) Enterprise Server. FIG. 2 illustrates a block diagram of an example lighting network control server 102.

In one embodiment, the lighting network control server 102 may include a processor 202, a computer readable storage medium 204, and a communication interface 210. In one embodiment, the processor 202 may be communicatively coupled to the computer readable storage medium 204 and the communication interface 210. The computer readable storage medium 204 may be a non-transitory computer readable storage medium such as a hard disk drive, random access memory (RAM), read only memory (ROM), and the like.

In one embodiment, the computer readable storage medium 204 may store sub-routines 206 and protocol adapter 208. The sub-routines 206 may include instructions that when executed by a processor analyze non-light related data for the third party automation controller 118, as discussed in further details below. In one embodiment, the sub-routines 206 may be stored on a database that is external to the lighting network control server 102. For example, the lighting network control server 102 may access the database of the sub-routines 206 via the communication interface 210.

In one embodiment, the protocol adapter 208 may include instructions that when executed by a processor translate non-light related data in a first format into a second format that is compatible with the third party automation controller 118, as discussed in further details below. For example, the protocol adapter 208 may generate a second set of translated data that is in a protocol format that can be understood or read by the third party automation controller 118.

In one embodiment, the communication interface 210 may be any type of communication interface. For example, the communication interface 210 may be a wired or wireless communication interface 210. The communication interface 210 may include a plurality of different communication interfaces 210. For example, the communication interface 210 may include a wired interface to communicate with the lighting network 104 and a wireless interface to communicate with the third party automation controller 119.

Referring back to FIG. 1, in one embodiment, the lighting network control server 102 may be used to control lighting devices 112 in the lighting network 104. For example, the lighting devices 112 may be beacon lights, high bay lights, or any other type of indoor or outdoor lighting device or fixture. In some embodiments, the lighting devices 112 may be light emitting diode (LED) based lights.

In one embodiment, the lighting devices 112 may be modified with a communication module 114. The communication module 114 may be any type of communication module 114 that can be used for wired or wireless communications or connections to other lighting devices 112 and a gateway (GW) 110 that is also in the lighting network 104. For example, the lighting devices 112 may collect light data (e.g., hours of operation, energy use, and the like) and transmit the data via the communication module 114 to the gateway 110 via a local area network (LAN) (e.g., via a Wi-Fi network). The gateway 110 may connect to a wide area network (WAN) (e.g., via broadband network, Ethernet network, and the like) and may transmit the data to the lighting network control server 102. The lighting network control server 102 may also transmit control signals to the lighting devices 112 via the same series of connections and the gateway 110.

In one embodiment, the network 100 may also include a user interface (UI) 122 to setup and commission the lighting devices 112. In one embodiment the UI 122 may be deployed via any type of endpoint device, such as for example, a laptop computer, a desktop computer, a smart-phone, a tablet computer, and the like.

In one embodiment, the communications capability of the lighting devices 112, the gateway 110 and the lighting network control server 102 may be used to collect non-light related data and transmit that data to a third party automation network. For example, data from an external device 116 may be collected and sent to the third party automation network for further analysis or correlations.

In one embodiment, "non-light related data" may be any type of data that is not associated with operation of any of the lighting devices 112 in the lighting network 104. In one embodiment, "non-light related data" may be any type of data that is collected from the external device 116 that is a not a light device.

An example of the external device 116 may be a heartbeat monitor attached to employees working in an underground tunnel. The non-light related data may include the heartbeat data. The non-light related data and light related may be transmitted across the lighting network 104 back to the lighting network control server 102. In another example, the external device 116 may include sensor devices and the non-light related data may include movement data that may be transmitted across the lighting network 104 back to the lighting network control server 102. In another example, the non-light related data may include building information such as temperature, door lock status, video data, and the like. The non-light related data may be transmitted across the lighting network 104 back to the lighting network control server 102. It should be noted that the above are only a few examples of non-light related data and other examples may be within the scope of the present disclosure.

In one embodiment, the third party automation network may include a third party automation controller 118 and a user interface (UI) 120. An example of the third party automation controller 118 may be a programmable logic controller (PLC) used by Rockwell® automation systems. The third party automation controller 118 may use a particular communication protocol that is not compatible with other automation networks or the protocol used by the lighting network control server 102 or the lighting network 104 that includes the lighting devices 112 and the gateway 110. Thus, in one embodiment, the lighting network control server 102 may include the communication interface 210 to establish the wired or wireless connection to the third party automation controller 118. As noted above, communication interface 210 may be a physical interface that provides either ports for a physical/wired connection or logical ports for a wireless connection to the third party automation controller 118.

In one embodiment, the protocol adapter 208 may translate the data in collected in the communication protocol used by the lighting network 104 (e.g., device control protocol (DCP) over Ethernet) into a communication protocol used by the third party automation controller 118. For example, third party automation networks such as Rockwell may use protocols such as Ethernet/IP®, BACnet/IP®, ControlNet®, Modbus®, ProfiNet®, and the like. Thus, the protocol adapter 208 may translate the communication protocol used to transport the data (e.g., light related and/or non-light related) via the lighting network 104 into an appropriate communication protocol used by the third party automation controller 118.

In one embodiment, additional code can be used to analyze the data and produce a desired output for a particular application. The third party automation controller 118 may provide the hardware and necessary processing capability, but the additional code is used to leverage the hardware and processing capability to analyze the data.

In one embodiment, the sub-routines 206 may comprise a library or a plurality of add-on instructions that can be browsed and downloaded to the third party automation controller 118 and the lighting network control server 102. In one embodiment, the same sub-routine or different sub-routines may be downloaded and installed on the lighting network control server 102 and the third party automation controller 118. In one embodiment, the sub-routine may modify the controller software executed by the third party automation controller 118 for a particular application to analyze data received from the network 100. In other words, the sub-routine on the lighting network control server 102 and the third party automation controller 118 may work together to analyze the data that is collected for a particular application.

For example, the UI 120 may provide a graphical user interface (GUI) that can display the available sub-routines 206 that can be downloaded to the third party automation controller 118. As a result, a user is not required to manually create or implement code to analyze the data. Rather, the sub-routines 206 may be written in advance by the lighting network service provider and stored in memory (e.g., the sub-routines 206).

To illustrate by example, the external device 116 may be a plurality of sensors that are located throughout a building or factory that uses the lighting devices 112 or has the lighting network 104. The building or factory is remotely located (e.g., in a different geographic location or region) from the lighting network control server 102. As different sensors throughout the building or factory are triggered, the sensor data (e.g., the non-light related data) may be collected by the communication module 114 of the lighting devices 112 and transmitted to the GW 110. In one embodiment, the data may be collected continuously or periodically (e.g., every hour, every day, and the like).

The sensor data may be transmitted to the lighting network control server 102. A user of the third party automation network may want to use the sensor data to determine locations within the building or factory that have a potential security threat. As a result, a user may use the UI 120 to download a sub-routine, from the sub-routines 206, related to correlating sensor data into potential security threats. The sub-routine may be downloaded from the sub-routines 206 and installed on the third party automation controller 118. The third party automation controller 118 may request the sensor data from the lighting network control server 102.

The protocol adapter 208 may translate the sensor data from a DCP over Ethernet protocol into an EtherNet IP protocol that the third party automation controller 118 may understand (e.g., the third party automation controller 118 may be a Rockwell automation control server). In one embodiment, translating may include the protocol adapter 208 generating a new set of data that is in the EtherNet IP protocol that can be understood by the third party automation controller 118.

The third party automation controller 118 may then use the sub-routine downloaded from the sub-routines 206 to analyze the translated sensor data and provide an output that indicates which locations in the building or factory are compromised based on the sensor data.

In another example, the external device 116 may be health monitors worn by workers in a mining tunnel that use a plurality of lighting devices 112 with the communication module 114. The health monitors worn by the workers may transmit heart rate and breathing rate data via the lighting devices 112 and the GW 110 to the lighting network control server 102. The location of the lighting device 112 that most recently collected the health monitor data may also provide a location tracking of a worker in the mining tunnel.

In one embodiment, a user of the third party automation network may want to use the health monitor data to determine whether a worker is experiencing a health condition or is exposed to some harmful particulates that the worker may not be aware of. The user may use the UI 120 to download a sub-routine related to correlating heart rate and breathing rate to a potential health risk or condition. The sub-routine may be downloaded from the sub-routines 206 and installed on the third party automation controller 118. The third party automation controller 118 may request the heart rate and breathing rate data from the lighting network control server 102.

The protocol adapter 208 may translate the heart rate and breathing rate data from a DCP over Ethernet protocol into an EtherNet IP protocol that the third party automation controller 118 may understand (e.g., the third party automation controller 118 may be a Rockwell automation control server). The third party automation controller 118 may use the sub-routine downloaded from the sub-routines 206 to analyze the heart rate and breathing rate data and provide an output that indicates which workers may be experiencing a health condition or be at a health risk based on the data.

Figure 3:
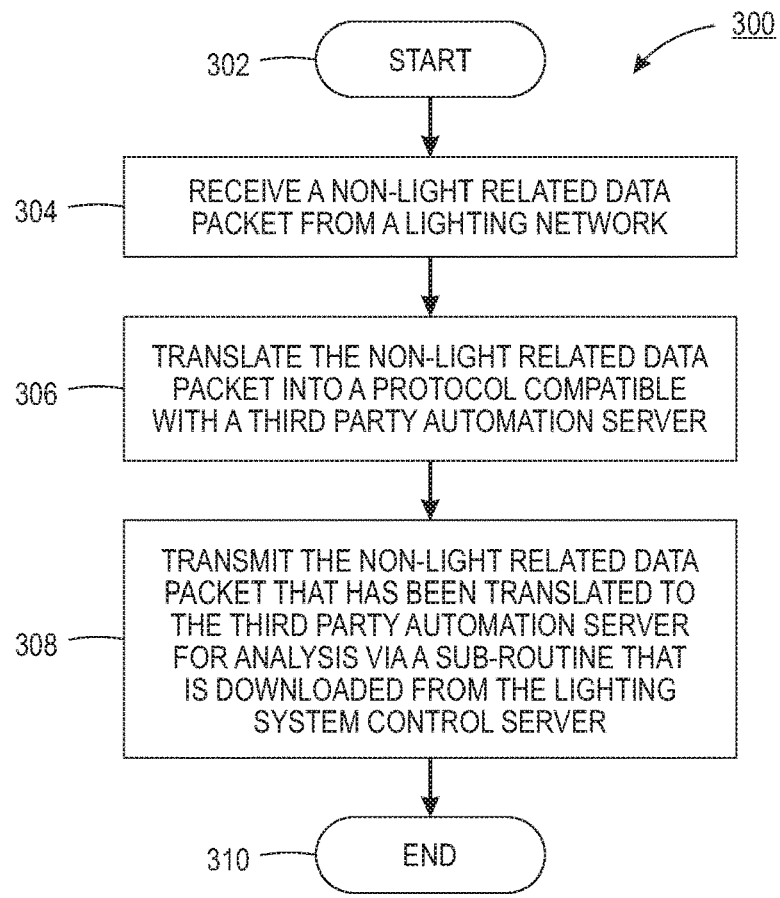
FIG. 3 illustrates a flow chart for an example method for translating non-light related data packets into a protocol that is compatible with a third party automation server.
Figure 4:
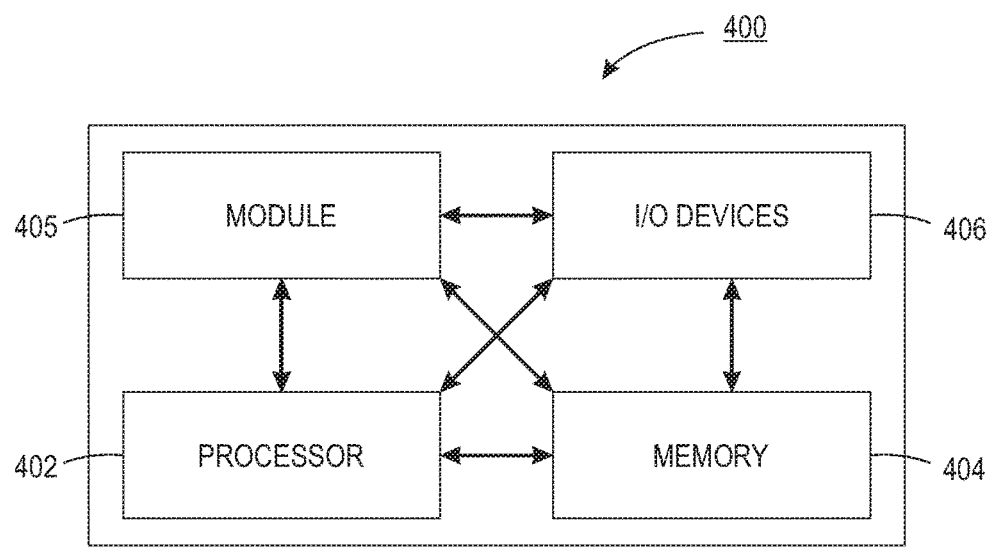
FIG. 4 provides a high-level block diagram of a computer suitable for use in performing the functions described herein.

FIG. 3 illustrates a flowchart of an example method 300 for translating non-light related data packets into a protocol that is compatible with a third party automation server. In one embodiment, one or more steps or operations of the method 300 may be performed by the lighting network control server 102 or a computer as illustrated in FIG. 4 and discussed below.

At block 302, the method 300 begins. At block 304, the method 300 receives a non-light related data packet from a lighting network. For example, the non-light related data packet may be generated by an external device such as a building sensor, a heartbeat monitor, a breathing monitor, a video imager, a thermostat, and the like. The external device may be in communication with lighting devices that have a communication module in the lighting network.

The non-light related data may be transmitted to the lighting devices with the communication module. The non-light related data may be transmitted across the lighting network with or without light related data (e.g., data related to operation of the lighting devices) to a gateway and then to a light network control server.

The non-light related data may be received in response to a request for the data from a third party automation controller. The lighting network control server may receive a request from the third party automation controller to obtain the non-light related data. The lighting network control server may then send a control signal to the external device via the communication modules in the lighting devices over the lighting network 104. The external device may then collect the non-light related data and transmit the data to the lighting network control server.

At block 306, the method 300 translates the non-light related data packet into a protocol compatible with a third party automation server. In one embodiment, a protocol adapter stored in the memory of the lighting network control server may translate the non-light related data packet from a first protocol format into a second protocol format. For example, the non-light related data packet may be received in a protocol format compatible with the lighting network 104. The protocol adapter may generate a translated non-light related data packet that is in a protocol format that is compatible with the third party automation controller.

At block 308, the method 300 transmits the non-light related data packet that has been translated into the third party automation server for analysis via a sub-routine that is downloaded from the lighting system control server. After the non-light data packet is translated, the non-light data packet may be transmitted to the third party automation server.

In one example, a sub-routine may be selected from a library of sub-routines stored in memory at the lighting network control server. In one embodiment, a graphical user interface may be used to view and select the sub-routine.

As noted above, the sub-routine may include add-on instructions that can be used to analyze the data for a particular application and to generate a specific output. For example, raw sensor data may not mean much to the third party automation controller. However, with a sub-routine that correlates sensor data to security notifications, the raw sensor data may be analyzed by a sub-routine to determine whether a security breach has occurred in a building.

As a result, the third party automation controller may initiate a security action in response to the security breach such as sending a signal to lock a door, shut down computers, shut down internet access, send a notification to security, and the like. The signal may be sent back over the lighting network 104. For example, the signal may be translated by the protocol adapter from the protocol format associated with the third party automation controller into the protocol format associated with the lighting network 104.

In another example, raw health data of an individual (e.g., heartbeat rate, breathing rate, blood pressure, and the like) may not mean much to the third party automation controller. However, with a sub-routine that correlates the raw health data to a health condition, the sub-routine may determine whether the individual has been over exposed to a particular environmental condition, is overly fatigued, and the like.

As a result, the third party automation controller may send a notification to the external device worn by the individual. The notification may indicate to the individual to take a break, seek immediate medical attention, and the like. The signal may be sent back over the lighting network 104. For example, the signal may be translated by the protocol adapter from the protocol format associated with the third party automation controller into the protocol format associated with the lighting network 104. At block 310, the method 300 ends.

FIG. 4 depicts a high-level block diagram of a computer that is dedicated to perform the functions described herein. As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for translating non-light related data packets into a protocol that is compatible with a third party automation server, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for translating non-light related data packets into a protocol that is compatible with a third party automation server (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for translating non-light related data packets into a protocol that is compatible with a third party automation server (including associated data structures) of the present disclosure can be stored on a tangible or physical (broadly non-transitory)

computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

Although only two examples are provided above, it should be noted that various other examples may be used to provide improved security and efficiency for companies and organizations. Thus, the embodiments of the present disclosure provide hardware and methods to connect the lighting network and data communication capabilities of the lighting network to a third party automation network. As a result, the hardware and processing capabilities of the third party automation network may be used to analyze the data collected by the lighting network using sub-routines provided by the lighting network service provider.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A lighting network control server, comprising:
a communication interface to receive data packets from a lighting network and to communicate with a third party automation server, wherein the data packets are generated by a sensor, wherein the data packets are transmitted to the lighting network control server in response to a request from the third party automation server that causes the lighting network control server to send a control signal to the sensor over the lighting network to collect the data packets generated by the sensor;
a non-transitory computer readable medium to store sub-routines, instructions to execute a protocol adapter, and data packets generated by the sensor, wherein each one of the sub-routines is written in advance by a lighting network service provider of the lighting network and comprises a different add-on instruction that is downloaded onto the third party automation server based on a type of data generated by the sensor to modify a controller software executed by the third party automation server for a particular application and to analyze the data packets generated by the sensor and produce an output for the particular application; and
a processor communicatively coupled to the communication interface and the non-transitory computer readable medium to execute the protocol adapter to translate the data packets from a device control protocol over Ethernet protocol used by the lighting network to transmit the data into a protocol that is compatible with the third party automation server by generating a new set of data that is in a protocol that is understood by the third party automation server and transmit the new set of data that are translated to the third party automation server via the communication interface to be analyzed by a sub-routine that is downloaded by the third party automation server.

2. The lighting network control server of claim 1, further comprising:
a graphical user interface to view, select, and download the sub-routines.

3. The lighting network control server of claim 1, wherein the data packets comprise sensor data that is collected and transmitted by at least one lighting device of the lighting network.

4. The lighting network control server of claim 3, wherein the non-light related data is from an external sensor device.

5. The lighting network control server of claim 1, wherein the communication interface receives the data packets from the lighting network via a gateway.

6. The lighting network control server of claim 1, wherein the protocol that is compatible with the third party automation server comprises at least one of: Ethernet/IP, BACnet/IP, ControlNet, Modbus, or ProfiNet.

7. A method, comprising:
receiving, by a processor of a lighting system control server, a request from a third party automation controller for a sensor data packet from a sensor;
transmitting, by the processor, a control signal to the sensor over a lighting network to collect the sensor data packet;
receiving, by the processor, the sensor data packet from the lighting network and storing the sensor data packet in a memory of the lighting system control server, wherein the sensor data packet is generated by a sensor;
receiving, by the processor, a request to download a sub-routine related to analyzing the sensor data packet, wherein the sub-routine is written in advance by a lighting network service provider of the lighting network and comprises add-on instructions that are downloaded based on a type of data generated by the sensor to modify a controller software executed by the third party automation server for a particular application and to analyze the sensor data packet generated by the sensor and produce an output for the particular application;
transmitting, by the processor, the sub-routine in response to the request to the third party automation server to be installed on a third party automation server;
translating, by the processor, the sensor data packet into a protocol compatible with the third party automation server via a protocol adapter, wherein the translating comprises generating a new set of data in a protocol that is understood by the third party automation server; and
transmitting, by the processor, the new set of data that is translated into the protocol that is understood by the third party automation server to the third party automation server for analysis via the sub-routine that is downloaded from the lighting system control server.

8. The method of claim 7, wherein the sub-routine is selected from a plurality of different sub-routines that are displayed in a graphical user interface of the lighting system control server.

9. The method of claim 7, wherein the sensor data packet is collected and transmitted by at least one lighting device of the lighting network.

10. The method of claim 7, wherein the sensor data packet is from an external sensor device.

11. The method of claim 7, wherein the protocol compatible with the third party automation server comprises at least one of: Ethernet/IP, BACnet/IP, ControlNet, Modbus, or ProfiNet.

12. A non-transitory computer-readable medium storing a plurality of instructions, which when executed by a processor of a lighting system control server, cause the processor to perform operations, the operations comprising:

receiving a request from a third party automation controller for a sensor data packet from a sensor;

transmitting a control signal to the sensor over a lighting network to collect the sensor data packet;

receiving the sensor data packet from the lighting network and storing the sensor data packet in a memory of the lighting system control server, wherein the sensor data packet is generated by a sensor;

receiving a request to download a sub-routine related to analyzing the sensor data packet, wherein the sub-routine is written in advance by a lighting network service provider of the lighting network and comprises add-on instructions that are downloaded based on a type of data generated by the sensor to modify a controller software executed by the third party automation server for a particular application and to analyze the sensor data packet generated by the sensor and produce an output for the particular application;

transmitting the sub-routine in response to the request to the third party automation server to be installed on a third party automation server;

translating, via a protocol adapter, the sensor data packet from a device control protocol over Ethernet protocol used by the lighting network to transmit the data into a protocol compatible with the third party automation server, wherein the translating comprises generating a new set of data into a protocol that is understood by the third party automation server; and transmitting the new set of data that is translated into the protocol understood by the third party automation server to the third party automation server for analysis via the sub-routine that is downloaded from the lighting system control server.

13. The non-transitory computer-readable medium of claim 12, wherein the sensor data packet is collected from an external sensor device and transmitted by at least one lighting device of the lighting network.

14. The non-transitory computer-readable medium of claim 12, wherein the protocol compatible with the third party automation server comprises at least one of: Ethernet/IP, BACnet/IP, ControlNet, Modbus, or ProfiNet.

* * * * *